US008463823B2

(12) United States Patent
Eisenhauer et al.

(10) Patent No.: US 8,463,823 B2
(45) Date of Patent: Jun. 11, 2013

(54) METHODS AND SYSTEMS FOR TRACKING BACKFLOW ASSEMBLIES

(75) Inventors: Mike Eisenhauer, Alsip, IL (US); Donald J. Smith, Mokena, IL (US)

(73) Assignee: Backflow Solutions, Inc., Alsip, IL (US)

( * ) Notice: Subject to any disclaimer, the term of this patent is extended or adjusted under 35 U.S.C. 154(b) by 115 days.

(21) Appl. No.: 13/173,863

(22) Filed: Jun. 30, 2011

(65) Prior Publication Data

US 2012/0030250 A1 Feb. 2, 2012

Related U.S. Application Data

(60) Provisional application No. 61/360,722, filed on Jul. 1, 2010.

(51) Int. Cl.
*G06F 17/30* (2006.01)

(52) U.S. Cl.
USPC ........................ 707/803; 73/113.01; 705/7.41

(58) Field of Classification Search
USPC ........................ 707/803; 73/113.01; 705/7.41
See application file for complete search history.

(56) References Cited

U.S. PATENT DOCUMENTS 5,713,240 A * 2/1998 Engelmann .................... 73/168
2009/0157521 A1 6/2009 Moren et al.
2010/0313958 A1* 12/2010 Patel et al. ....................... 137/1

FOREIGN PATENT DOCUMENTS

WO WO 2008/091665 A2 7/2008

* cited by examiner

*Primary Examiner* — Thu-Nguyet Le
(74) *Attorney, Agent, or Firm* — Miller, Matthias & Hull LLP

(57) ABSTRACT

A method of tracking backflow assemblies is provided. The method comprises the steps of receiving backflow assembly data for water customers associated with a water supply system, generating a database based on the backflow assembly data, transmitting test reminder notifications to testers associated with the water customers, receiving test result data from the testers, updating the database based on the test result data, and transmitting the test result data to municipal administrators. The backflow assembly data includes water customer information, backflow assembly information and backflow test history information. The database is stored within a storage device. The testers are notified based at least partially on the backflow assembly data. The updated database is stored within the storage device.

20 Claims, 5 Drawing Sheets

32

34

METHODS AND SYSTEMS FOR TRACKING BACKFLOW ASSEMBLIES

CROSS-REFERENCE TO RELATED APPLICATION

This application is a non-provisional application claiming the priority benefit under 35 U.S.C. 119(e) of U.S. provisional application number 61/360,722, filed on Jul. 1, 2010.

BACKGROUND

1. Technical Field:

The present disclosure relates to backflow assemblies, and more particularly, to systems and methods for tracking backflow prevention devices associated with one or more water supply systems.

2. Description of the Related Art:

Treated or potable water in water supply systems, such as the water supplied to a residential building, a commercial building, or the like, is maintained at predefined pressures so as to facilitate water flow from an outlet, such as a tap, shower head, and the like. The pressure within the pipes of such water supply systems can vary significantly depending on several factors. For instance, pressures may fall below desired levels when a water main bursts, pipes freeze, or if there is an unexpectedly high demand on the shared water supply system. Significant drops in pressure may cause backflow between different water sources and allow untreated water from the ground or other undesirable sources to be drawn into the treated water supply. To prevent such backflow contamination, it is often required to provide a backflow prevention device or backflow assembly between the delivery point of a water supply and where water is locally stored or accessed for use.

The typical backflow prevention device is comprised of test cocks, shut-off valves and independently operated spring-loaded check valves. A check valve is a common form of a backflow prevention device. Over time, the valves of a backflow assembly may lose its ability to maintain a proper seal, and further, lose its ability to maintain proper pressures within the water lines. The functionality of a backflow assembly is essential in isolating certain water supplies from contamination, pollution, or the like.

Therefore, while many municipalities require backflow assemblies, those municipalities also require periodic testing and maintenance of the backflow assemblies. Currently, municipalities, as well as many privately-owned water suppliers, manually track the backflow assemblies that are installed in the vicinity of its respective water customers. For instance, each backflow prevention device is tracked by the municipality or water supplier using paper files and documents that are maintained essentially by hand, or manually entered into an electronic tracking system by hand. With respect to water supply systems that are owned by municipalities, municipal administrators mail reminder letters and notices to the respective water customers periodically, for example, annually or bi-annually, to remind the water customers of an approaching backflow inspection deadline. Water customers may then contact a backflow inspector or tester to arrange for an inspection. Once the inspection is complete, testers may record the test results onto a form that is then submitted to the municipality by hand, via mail or facsimile. Upon receiving the forms containing the test results, the municipality may sort the forms by hand and categorize the forms with the water customer address. While collecting and filing test results for backflow assemblies that have passed the inspection, municipal administrators may also monitor for untested and/or failed backflow assemblies. If any backflow assembly has failed or has not been tested by the inspection deadline, the municipal administrators may then contact those water customers and respond accordingly.

Thus, tracking even one backflow assembly requires a significant amount of work and coordination on the part of the water supplier or municipality, the water customer and the backflow assembly tester. A typical municipality may account for several backflow assemblies that are installed at various residential or commercial structures and facilities which specifically require the installation of backflow assemblies. Additionally, the municipality may further account for backflow assemblies that have been recently removed or newly installed due to new developments or any other significant change to the water supply system. Furthermore, the municipality may go through the tracking process on a yearly or bi-yearly basis. While the current system of tracking backflow assemblies may be adequate, there is much room for improvement. For instance, the current system is too reliant on the municipality or the municipal administrators to collect and manage all of the files associated with water customers and their respective backflow assemblies. This results in an unnecessarily high need for labor and associated labor costs while introducing a significant potential for human error. The overall system currently in place is also difficult and time consuming to manage. For example, it may be cumbersome to update files and to adapt the current system for every new development or change within the municipality on a yearly or bi-yearly basis.

Therefore, there is a need for an improved method or system that facilitates the management of backflow assemblies. Specifically, there is a need for a backflow tracking system that is more efficient, cost-effective and requires minimal involvement by municipal administrators such that the municipalities can redirect and devote more of its workforce and resources toward more important concerns of the respective community. Moreover, there is a need for a more adaptive and accessible method or system that automates many of the intermediary steps involved with tracking and testing backflow assemblies.

SUMMARY OF THE DISCLOSURE

In satisfaction of the aforenoted needs, a method of tracking backflow assemblies is disclosed. The method includes the steps of receiving backflow assembly data for water customers, generating a database based on the backflow assembly data, transmitting test reminder notifications to testers, receiving test result data from the testers, updating the database based on the test result data, and transmitting the test result data to municipal administrators. The backflow assembly data includes water customer information, backflow assembly information and backflow test history information. The database is stored within a storage device. The testers are notified based at least partially on the backflow assembly data. Furthermore, the updated database is stored within the storage device.

In a refinement, the method includes a step of generating a first user interface that is configured to receive the backflow assembly data from the municipal administrators.

In another refinement, the method includes a step of generating a second user interface that is configured to receive test result data from the testers.

In a related refinement, the second user interface is provided at a host computer accessible by the tester over a wide area network.

In another refinement, the method includes a step of transmitting test reminder notifications to the associated water customers.

In another refinement, the method includes a step of transmitting non-compliance notifications to the municipal administrators in response to untested backflow assemblies and failed backflow assemblies.

In another refinement, access to the storage device and the database stored therein is only accessible by the municipal administrators and authorized personnel.

In another refinement, the backflow test history information includes the last tester of record.

In another refinement, the test reminder notifications are transmitted in the form of electronic mails.

In yet another refinement, the test result data from the testers are received over a wide area network.

A system for tracking backflow assemblies is also disclosed. The system includes a storage device, a communication device and a computational device in electrical communication with the storage and communication devices. The computational device is configured to receive backflow assembly data, generate a database based on the backflow assembly data, transmit test reminder notifications to testers associated with the water customers via the communication device, receive test result data from the testers via the communication device, update the database based on the test result data, and transmit the test result data to the municipal administrators via the communication device. The backflow assembly data includes water customer information, backflow assembly information and backflow test history information. The database is stored within the storage device. The testers are notified based at least partially on the backflow assembly data.

In a refinement, the storage device is a secure storage device that is fully accessible only by municipal administrators and authorized personnel.

In another refinement, the communication device is configured to electronically communicate with any host computer within a wide area network.

In another refinement, the computational device further generates a first user interface that is configured to receive the backflow assembly data from the municipal administrators via the communication device.

In another refinement, the computational device further generates a second user interface that is configured to receive test result data from the testers via the communication device.

In another refinement, the computational device further transmits test reminder notifications to the associated water customers.

In another refinement, the computational device further transmits non-compliance notifications to the municipal administrators in response to untested backflow assemblies and failed backflow assemblies.

In another refinement, the backflow test history information includes the last tester of record.

In yet another refinement, the test reminder notifications are transmitted in the form of electronic mails.

Yet another system for tracking backflow assemblies is disclosed. The system includes a secure storage device, a communication device and a computational device in electrical communication with the secure storage and communication devices. The computational device is configured to generate a first user interface that is configured to be accessible by municipal administrators, generate a database based on the backflow assembly data, store the database in the secure storage device, associate a tester to each water customer based on the backflow test history information, transmit test reminder notifications to the testers associated with the water customers via the communication device, generate a second user interface that is configured to be accessible by the testers, update the database with the test result data, transmit the test result data to the municipal administrators via the communication device, and transmit non-compliance notifications to municipal administrators corresponding to untested backflow assemblies and failed backflow assemblies. The first user interface is configured to receive backflow assembly data including water customer information, backflow assembly information, and backflow test history information. The second user interface is configured to receive test result data from the testers via the communication device.

Other advantages and features will be apparent from the following detailed description when read in conjunction with the attached drawings.

BRIEF DESCRIPTION OF THE DRAWINGS

The disclosed methods and systems are described more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. It should be understood, that this disclosure is not limited to the particular embodiments and methods illustrated herein.

DETAILED DESCRIPTION OF THE PRESENTLY PREFERRED EMBODIMENTS

Figure 1:
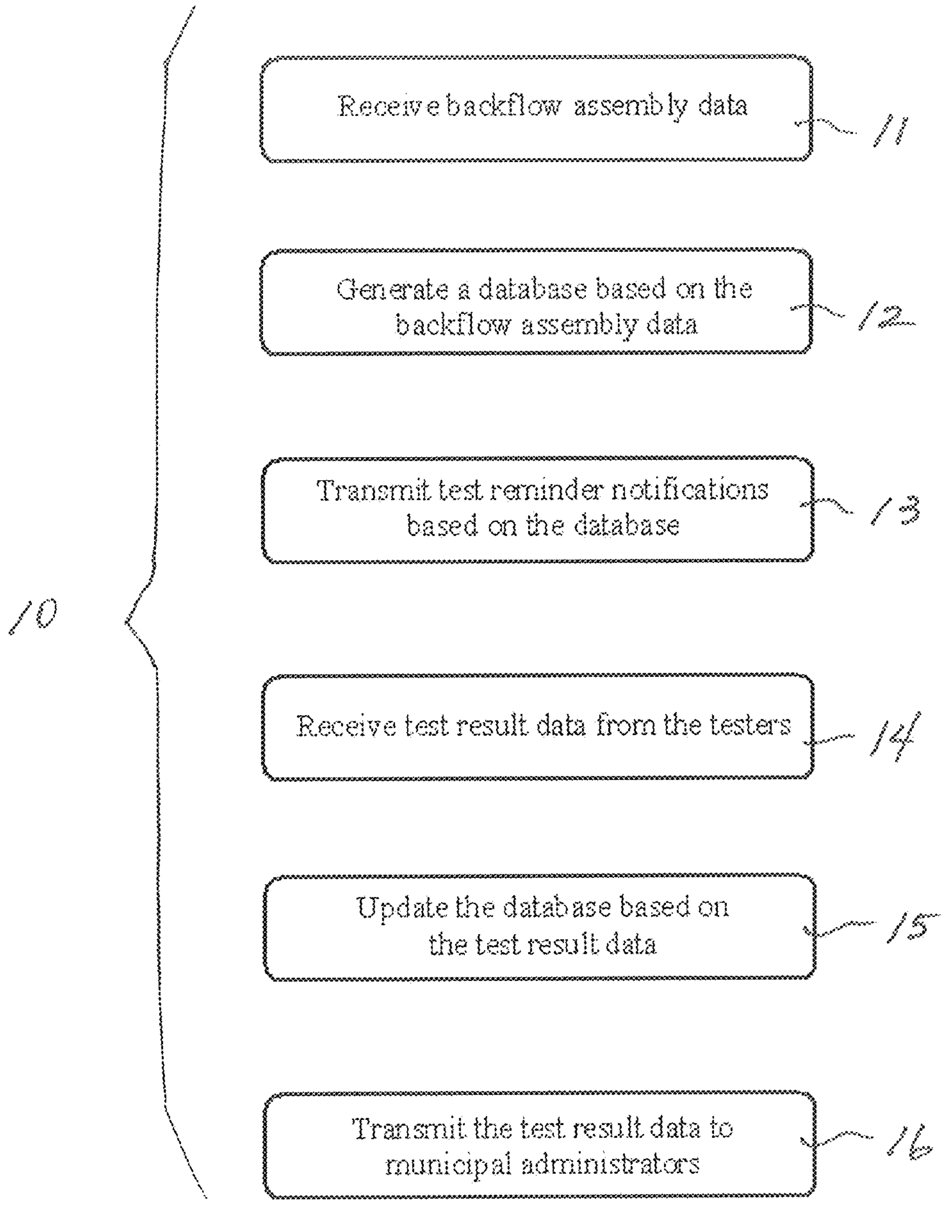
FIG. 1 is a flow diagram of an exemplary method for tracking backflow assemblies constructed in accordance with this disclosure.

Referring to the drawings and with particular reference to FIG. 1, an exemplary method for tracking backflow assemblies is provided and referred to as reference number 10.

The method 10 shown may be implemented as an algorithm which performs the plurality of steps 11-16 for tracking the backflow assemblies associated with one or more privately-owned water supply systems and/or within one or more municipalities, territories, districts, regions, or the like. In step 11, the method 10 may initially receive backflow assembly data associated with the water customers associated with a water supply system or municipality. The backflow assembly data may include any data that is relevant for tracking the backflow assemblies of each water customer associated with the shared water supply system, such as general water customer information, backflow assembly information, backflow test history information, and the like. The backflow assembly and test history data may include information pertaining to the configuration, type and size of each backflow assembly, results of the last inspection conducted on each backflow assembly, the last backflow inspector or tester of record, or any other specification necessary for tracking the installed backflow prevention devices.

Still referring to FIG. 1, the method 10 may include an additional step 12 in which the backflow assembly data collected in step 11 may be used to generate a backflow assembly database. More specifically, the backflow assembly data entered in step 11 may be electronically categorized and stored according to any database architecture or classification scheme commonly used in the art such that each entry may easily be referenced for later use or access. Among other things, the backflow assembly data in the database may be referenced so as to determine the individuals to be notified when, for instance, a backflow inspection deadline is approaching. The individuals to be notified may include water customers, backflow assembly inspectors or testers and/or municipal administrators. The water customer to be notified may be determined based on the customer's location, the respective type of backflow assembly installed, the date a backflow inspection is due, the municipal ordinance governing the backflow assembly, or the like. The tester may be notified based on the last tester of record associated with a particular backflow prevention device, the backflow assembly location, the type of backflow assembly installed at the customer location, or any other suitable criteria.

Once the respective recipients of test reminder notifications have been established, the method 10 may generate and transmit test reminder notifications to those water customers and/or testers as shown in step 13 of FIG. 1. The test reminder notifications may be generated as printable form letters that are sent by mail or facsimile, as electronic messages to be transmitted by electronic mail, mobile telephone messages or alerts, or the like. The test reminder notifications may serve to remind the water customer and the corresponding tester to arrange a backflow inspection in advance of the inspection deadline as set forth by the respective municipality. The test reminder notifications transmitted to the water customers may be configured to inform the customer of, for example, the type of backflow assembly installed, the backflow inspection deadline, the last tester of record, and/or a list of other certified testers that are within range of the customer and capable of performing the inspection. The test reminder notifications that are transmitted to testers may be configured to inform the tester of, for example, the water customers last serviced by the respective tester, the specifications of the backflow assemblies last serviced or inspected by the tester, the backflow inspection deadline, the municipal administrator or authorized personnel associated with the water customer, or the like. The method 10 may also generate and transmit test reminder notifications to any municipal administrator or authorized personnel that may be responsible for the area requiring backflow inspections. Automated notifications may be generated according to a predetermined sequence or schedule. Automated notifications may also be generated according to a conditional sequence, wherein a notification is automatically generated once certain conditions, for example, as specified by the municipal administrator, have been met. Moreover, the sequence defined for each entity, group of entities, or for a particular municipality may further be individually customizable so as to generate more or fewer notifications. Furthermore, the contents and/or format of the automated notifications may be individually customizable based on the particular municipality, water supplier, or the like.

Upon performing an inspection and any necessary repairs on a backflow prevention device, the tester may report the inspection or test result data to the municipality and/or the water supplier. Accordingly, the method 10 may be configured to electronically receive the test result data from the tester in step 14. For instance, the tester may submit the test result data via a desktop computer, a laptop computer, a handheld mobile device, a mobile telephone, or any other device capable of communicating with the database generated in step 12. The test result data may be submitted by the tester via electronic mail, through an electronic online interface, through mobile messages, or any other suitable electronic communication means. Among other things, the test result data may include general water customer information, the type of backflow assembly that was inspected, the type of inspection that was performed, the type of test kit that was used, any repairs that were performed, whether the backflow assembly passed or failed the inspection, and the like. In particular, the data fields that are required from each test may differ for each individual municipality. Accordingly, the method 10 may enable individual municipalities to customize the contents of the test report form as required by each individual municipality. Based on the contents of the test result data, the method 10 may additionally calculate any payment that may be required from the tester by the municipality and/or water supplier, and further, enable electronic transaction of such payment.

As shown in FIG. 1, once the test result data has been submitted by the tester, the method 10 may be configured to update the database with the new test result data in step 15.

More specifically, the method 10 may be configured to scan the transmission from the tester and automatically categorize, route and store the data entries of the test result data into the database accordingly. The method 10 may also transmit the received test result data, or a summary thereof, to the respective municipal administrators or authorized personnel responsible for the inspected backflow assembly, such as in step 16 shown. In alternative embodiments, the method 10 may further process the received test result data and determine whether the test indicates a failed backflow assembly. The method 10 may also scan the database to determine backflow assemblies that have not been tested and their corresponding water customers. In such embodiments, the method 10 may be configured to automatically and electronically notify the necessary municipal administrators or personnel of the failed and/or untested backflow assemblies.

Figure 2:
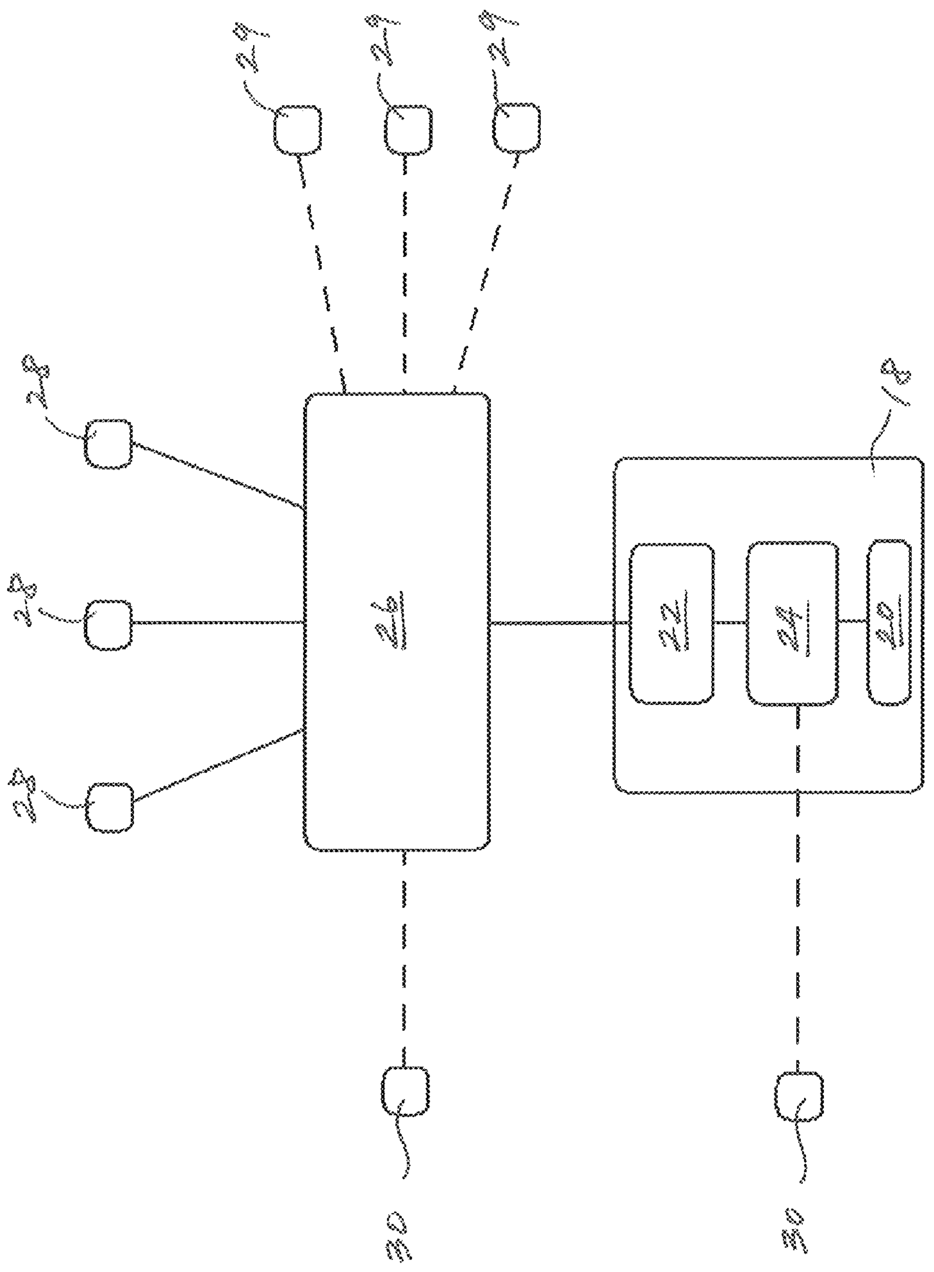
FIG. 2 is a schematic view of a system for tracking backflow assemblies.

Turning now to FIG. 2, an exemplary system 18 for tracking backflow assemblies is provided. The system 18 may be implemented by, for example, one or more servers and may be configured to include a storage device 20, a communication device 22 and a computational device 24. The storage device 20 may include any combination of storage media or memory as commonly used in the art to electronically store and/or recall data. More specifically, the storage device 20 may be configured to retrievably store backflow assembly data or the database created in, for instance, step 12 of the method 10 of FIG. 1. The storage device 20 may also be configured as a secure storage device such that only certain municipal administrators and any other authorized personnel have access thereto. The communication device 22 may include means for electronically transmitting and receiving information between the system 18 and a network 26. The network 26 may include a wide area network (WAN), such as the Internet, a local area network (LAN), or any other network that allows wired and/or wireless communications between one or more remote host devices 28-30 that may otherwise be disconnected from the system 18 and/or each other. Each host device 28-30 may represent a desktop computer, a laptop computer, a handheld device, a mobile telephone, or any other computational device that is capable of electronically connecting to the network 26. In the particular embodiment of FIG. 2, the host devices 28 represent devices that may be used by the testers while the host devices 29, 30 represent devices that may be used by water customers and municipal administrators, respectively.

The computational device 24 may include a processor, a controller, a microprocessor or a microcontroller that is in electrical communication with each of the storage and communication devices 20, 22. The computational device 24 may be provided with, for example, a series of program code, or the like, configured to perform according to the method 10 of FIG. 1. More specifically, in correlation to step 11 of FIG. 1, the computational device 24 may be configured to receive backflow assembly data including water customer information, backflow assembly information and backflow test history information. Such backflow assembly data may be entered into the system 18 by municipal administrators and authorized personnel from a local host computer 30 that is in direct communication with the system 18. Alternatively, backflow assembly data may be entered from a remote host computer 30 that is connected to the system 18 through the network 26. In this case, the computational device 24 may retrieve the backflow assembly data from the network 26 via the communication device 22.

Figure 3A:
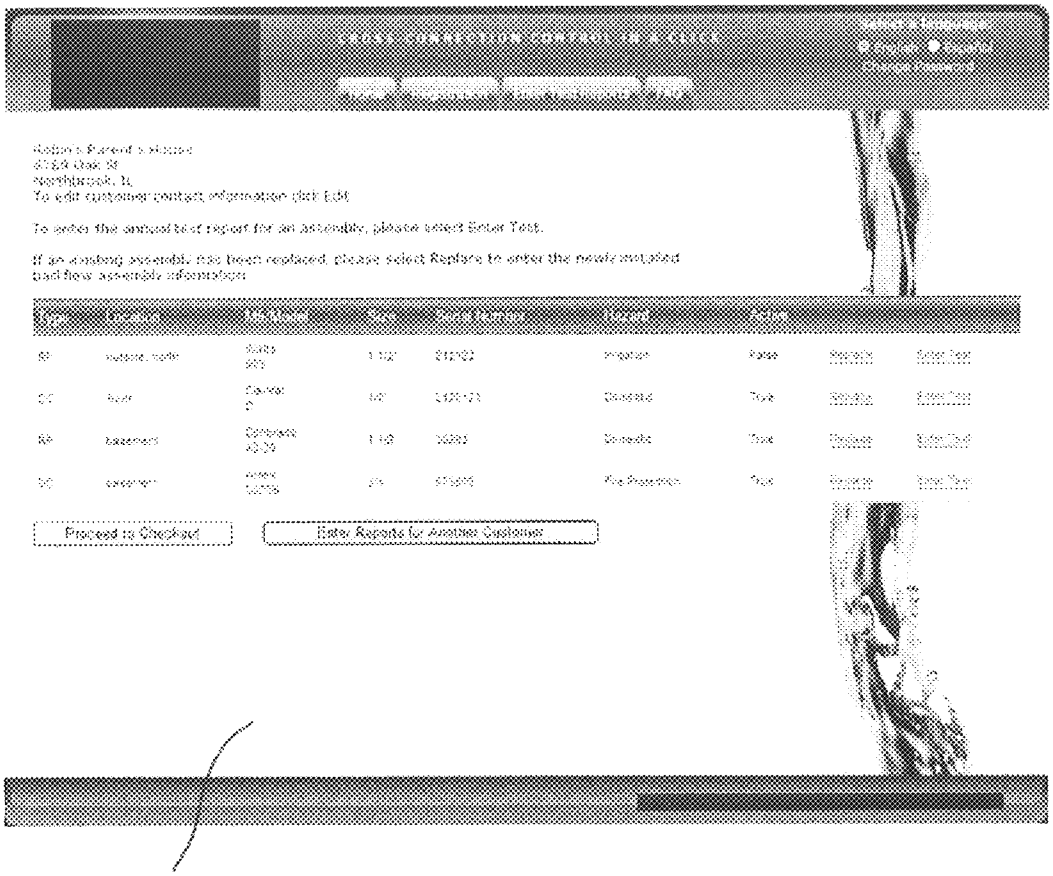
FIGS. 3A-3B are pictorial views of a first user interface.
Figure 3B:
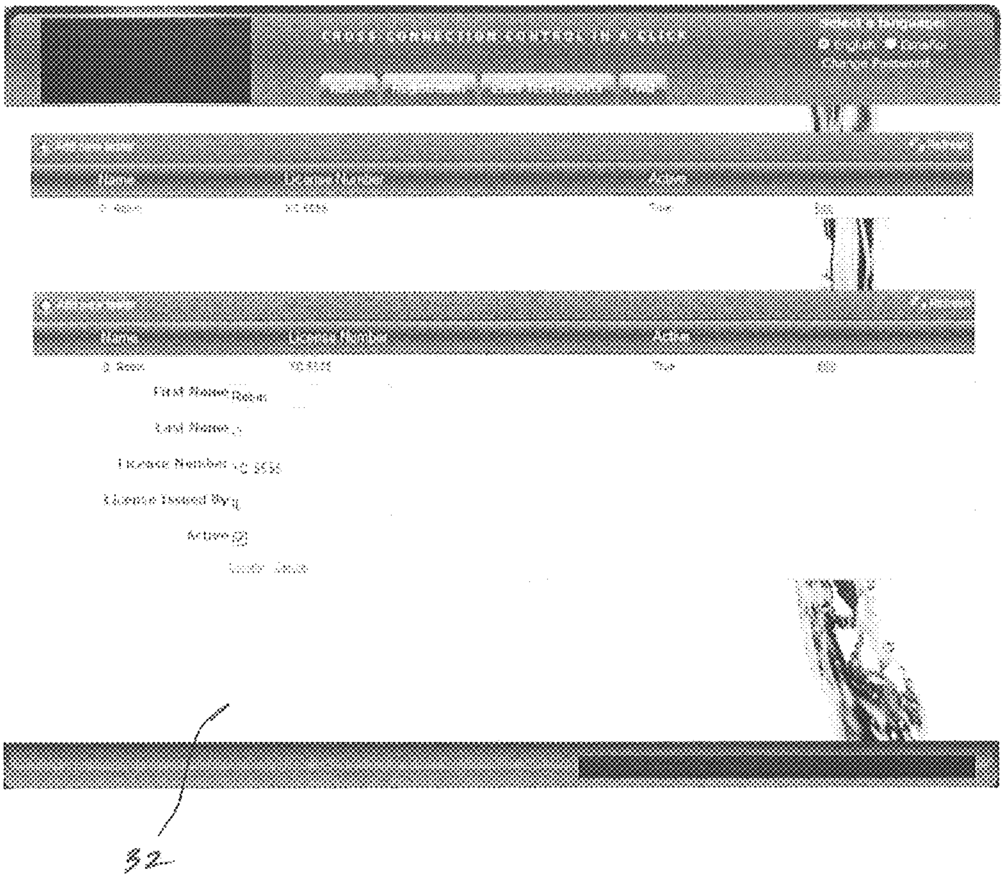

As shown in FIGS. 3A-3B, the backflow assembly data may be entered manually at the host device or computer 30 using a first user interface 32 that is installed at the host computer 30 and/or at the system 18. The first user interface 32 may be provided at the host computer 30 when municipal administrators or any other authorized personnel access a connection to the system 18 either directly or remotely through the network 26. The first user interface 32 may provide a list of currently existing water customers, and further, allow municipal administrators to edit existing water customer entries or add new water customer entries. As shown in FIG. 3A, some of the more detailed information that may be entered or modified through the first user interface 32 may include, for example, the water customer address and contact information, the number of backflow assemblies installed in the vicinity of the water customer's site, the manufacturer, model, size, serial number and location of each backflow assembly, the potential hazards associated with each backflow assembly, the most recent inspection status of each backflow assembly, and the like. As shown in FIG. 3B, the first user interface 32 may also enable municipal administrators to edit existing tester information or add new tester information. For example, the first user interface 32 may be configured to receive the first and last names of a certified or licensed inspector or tester, the license number associated with the tester, the issuer of the license, the current status of the tester, and the like.

The computational device 24 of FIG. 2 may further be configured to generate a database based on the received backflow assembly data, as in step 12 of the method 10 of FIG. 1. Moreover, the computational device 24 may electronically categorize and sort the backflow assembly data that is entered into the first user interface 32 of FIGS. 3A-3B by municipal administrators or other authorized personnel. The backflow assembly data may include water customer information, backflow assembly information and backflow test history information. The categorized and sorted data may be collected into one easily accessible backflow assembly database that is further stored within a memory of the storage device 20 for future access. Based on the correlated information contained within the database, the computational device 24 may associate at least one backflow inspector or tester to each water customer. For example, the computational device 24 may be configured to determine the last tester of record for each water customer based on the backflow test history information, and automatically assign that tester to the water customer. If a particular water customer, or the associated backflow assembly, is a new entity and does not have an associated tester on record, the computational device 24 may omit this field and/or entry until such a tester of record is established.

Once a tester is assigned to each water customer and when a backflow inspection deadline is approaching, the computation device 24 may be configured to transmit test reminder notifications to the necessary individuals, as in step 13 of the method 10 of FIG. 1. Moreover, the computational device 24 may be configured to transmit test reminder notifications, for example, one month prior to the backflow inspection deadline as set forth by the municipal ordinance. The computational device 24 may be configured to automatically generate electronic messages to be transmitted by the communication device 22, through the network 26 and to the respective host computers 28-30. For example, electronic test reminder notifications may be transmitted via electronic mail, mobile telephone messages or alerts, or the like. Alternatively, the computational device 24 may electronically generate form letters that may be printed, signed and mailed to the respective individuals by municipal administrators and authorized personnel. The test reminder notifications may include, for example, general water customer information, the respective backflow assembly specifications, the backflow inspection deadline, tester information, the corresponding municipal administrators and personnel, and the like. The communication and computational devices 22, 24 may be configured to connect to the network 26 and transmit such test reminder notifications to the host devices 28 of testers associated with the backflow prevention devices that are due for inspection. In an alternative embodiment, the communication and computational devices 22, 24 may be configured to connect to the network 26 and transmit test reminder notifications to the host devices 29, 30 of water customers and/or the municipal administrators associated with the backflow prevention devices that are due for inspection.

Figure 4:
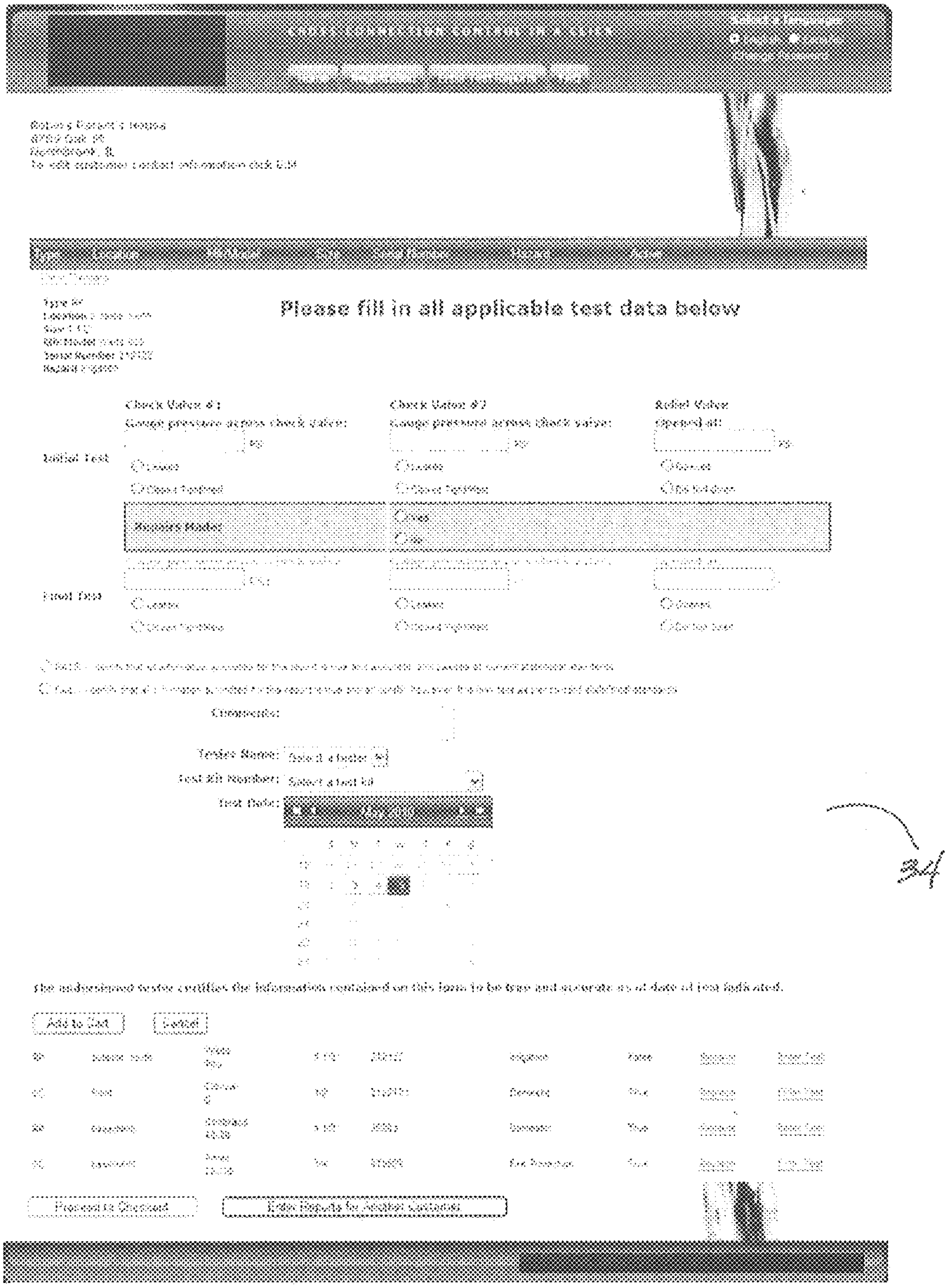
FIG. 4 is a pictorial view of a second user interface.

The computational device 24 may additionally be configured to receive test result data from the testers once a backflow assembly has been inspected. Specifically, upon completing an inspection of a backflow assembly, a tester may electronically submit the test result data using a host device 28 that is in communication with the network 26, and thus, the communication device 22 of the system 18 of FIG. 2. The host device 28 possessed by the tester may be a desktop computer, a laptop computer, a mobile telephone, or the like. When connected to the system 18 via the network 26, the host device 28 may be provided with a user interface, such as the online form or second user interface 34 of FIG. 4, to enable the tester to instantly transmit the required test result data to the municipality or other agency governing the water supply system. As shown, the second user interface 34 may provide entries for check valve pressure readings, the condition of the check valves, the types of repairs that were performed, and the like. The second user interface 34 may also require additional information, such as the tester name, the test kit number used in conducting the inspection, the inspection date, and the like. Moreover, the contents and/or format of the second user interface 34 may be customized according to the requirements or preferences of the associated municipality. Based on the readings and conditions of the check valves, the tester may indicate on the second user interface 34 whether the backflow prevention device or assembly has passed or failed the inspection. Furthermore, based on the data entered, the second user interface 34 may additionally calculate any payment that may be required from the tester by the municipality and/or water supplier, and further, enable electronic transaction of such payment.

Once complete, the tester may electronically submit the test result data, as well as any associated payment, by selecting the corresponding commands on the second user interface 34. The submitted test result data may be retrieved from the network 26 by the communication and computational devices 22, 24 of the system 18. More specifically, the computational device 24 may be configured to categorize and add the test result data to the corresponding portions of the database stored in the storage device 20. Upon retrieving test result data from the network 26, the computational device 24 may also be configured to automatically forward or relay the test result data to municipal administrators and their respective host computers 30. In further modifications, the computational device 24 may be configured to automatically generate and transmit non-compliance notifications to the host computers 30 of municipal administrators and authorized personnel to report failed and/or untested backflow assemblies. Such non-compliance notifications may also be generated and transmitted to the host computers 29 of water customers with failed and/or untested backflow assemblies.

In still further modifications, the computational device 24 may be configured to provide the testers as well as the municipalities with other additional features. For instance, based on the various data previously collected and stored in the database, the computational device 24 may be configured to provide each individual tester with a history of past tests and user accounts. The testers may also be enabled to manage user accounts, such as adding new users or customers, editing information associated with existing users or customer, deleting users or customers, and the like. The computational device 24 may also provide municipalities with various reporting features, such as the option to calculate the number of backflow assemblies that are situated within a particular district, sector, block, or street within the municipality. In some embodiments, the computational device 24 may present two or three dimensional graphical views or maps of the municipality and the relative positions of all of the backflow assemblies situated therein. Such an interface may provide features enabling the municipal administrators to zoom in or out of the graphical views to determine, for example, the locations of the passed, failed, or untested backflow assemblies within a specific area of the municipality. Furthermore, by pointing to one of the mapped backflow assemblies, municipal administrators may be provided with details of that particular backflow assembly, such as the specifications, address, owner, last test date, test status, and the like. The computational device 24 may also enable municipalities the ability to specify multiple license requirements as well as the ability to track the associated expiration dates of the licenses.

In satisfaction of the above-identified needs, improved methods and systems for facilitating the management of backflow assemblies are disclosed. By automating several intermediary steps involved with tracking backflow assemblies and by minimizing the municipal resources required to perform same, the present disclosure provides a more efficient, cost-effective and adaptable solution to maintain backflow prevention within a community.

While only certain embodiments have been set forth, alternatives and modifications will be apparent from the above description to those skilled in the art. These and other alternatives are considered equivalents and within the spirit and scope of this disclosure and the appended claims.

What is claimed:

1. A computer implemented method of tracking backflow assemblies, comprising the steps of:

receiving backflow assembly data for water customers associated with a water supply system, the backflow assembly data including water customer information, backflow assembly information, and backflow test history information;

generating a database based on the backflow assembly data, the database being stored within a storage device;

transmitting test reminder notifications to testers associated with the water customers, the testers being notified based at least partially on the backflow assembly data;

receiving test result data from the testers;

updating the database based on the test result data, the updated database being stored within the storage device; and transmitting the test result data to municipal administrators.

2. The method of claim 1 further comprising a step of generating a first user interface that is configured to receive the backflow assembly data from the municipal administrators.

3. The method of claim 1 further comprising a step of generating a second user interface that is configured to receive test result data from the testers.

4. The method of claim 3, wherein the second user interface is provided at a host computer accessible by the tester over a wide area network.

5. The method of claim 1 further comprising a step of transmitting test reminder notifications to the associated water customers.

6. The method of claim 1 further comprising a step of transmitting non-compliance notifications to the municipal administrators in response to untested backflow assemblies and failed backflow assemblies.

7. The method of claim 1, wherein access to the storage device and the database stored therein is only accessible by the municipal administrators and authorized personnel.

8. The method of claim 1, wherein the backflow test history information includes the last tester of record.

9. The method of claim 1, wherein the test reminder notifications are transmitted in the form of electronic mails.

10. The method of claim 1, wherein the test result data from the testers are received over a wide area network.

11. A system for tracking backflow assemblies, comprising:

a storage device;

a communication device; and a computational device in electrical communication with the storage and communication devices, the computational device being configured to:

receive backflow assembly data including water customer information, backflow assembly information, and backflow test history information, generate a database based on the backflow assembly data, the database being stored within the storage device, transmit test reminder notifications to testers associated with the water customers via the communication device, the testers being notified based at least partially on the backflow assembly data, receive test result data from the testers via the communication device, update the database based on the test result data, and transmit the test result data to the municipal administrators via the communication device.

12. The system of claim 11, wherein the storage device is a secure storage device that is fully accessible only by the municipal administrators and authorized personnel.

13. The system of claim 11, wherein the communication device is configured to electronically communicate with any host computer within a wide area network.

14. The system of claim 11, wherein the computational device further generates a first user interface that is configured to receive the backflow assembly data from the municipal administrators via the communication device.

15. The system of claim 11, wherein the computational device further generates a second user interface that is configured to receive test result data from the testers via the communication device.

16. The system of claim 11, wherein the computational device further transmits test reminder notifications to the associated water customers.

17. The system of claim 11, wherein the computational device further transmits non-compliance notifications to the municipal administrators in response to untested backflow assemblies and failed backflow assemblies.

18. The system of claim 11, wherein the backflow test history information includes the last tester of record.

19. The system of claim 11, wherein the test reminder notifications are transmitted in the form of electronic mails.

20. A system for tracking backflow assemblies, comprising:

a secure storage device;

a communication device; and a computational device in electrical communication with the secure storage and communication devices, the computational device being configured to:

generate a first user interface that is configured to be accessible by municipal administrators, the first user interface being configured to receive backflow assembly data including water customer information, backflow assembly information, and backflow test history information, generate a database based on the backflow assembly data, store the database in the secure storage device, associate a tester to each water customer based on the backflow test history information, transmit test reminder notifications to the testers associated with the water customers via the communication device, generate a second user interface that is configured to be accessible by the testers, the second user interface being configured to receive test result data from the testers via the communication device, update the database with the test result data, transmit the test result data to the municipal administrators via the communication device, and transmit non-compliance notifications to municipal administrators corresponding to untested backflow assemblies and failed backflow assemblies.

* * * * *